No. 778,695.  Patented December 27, 1904.

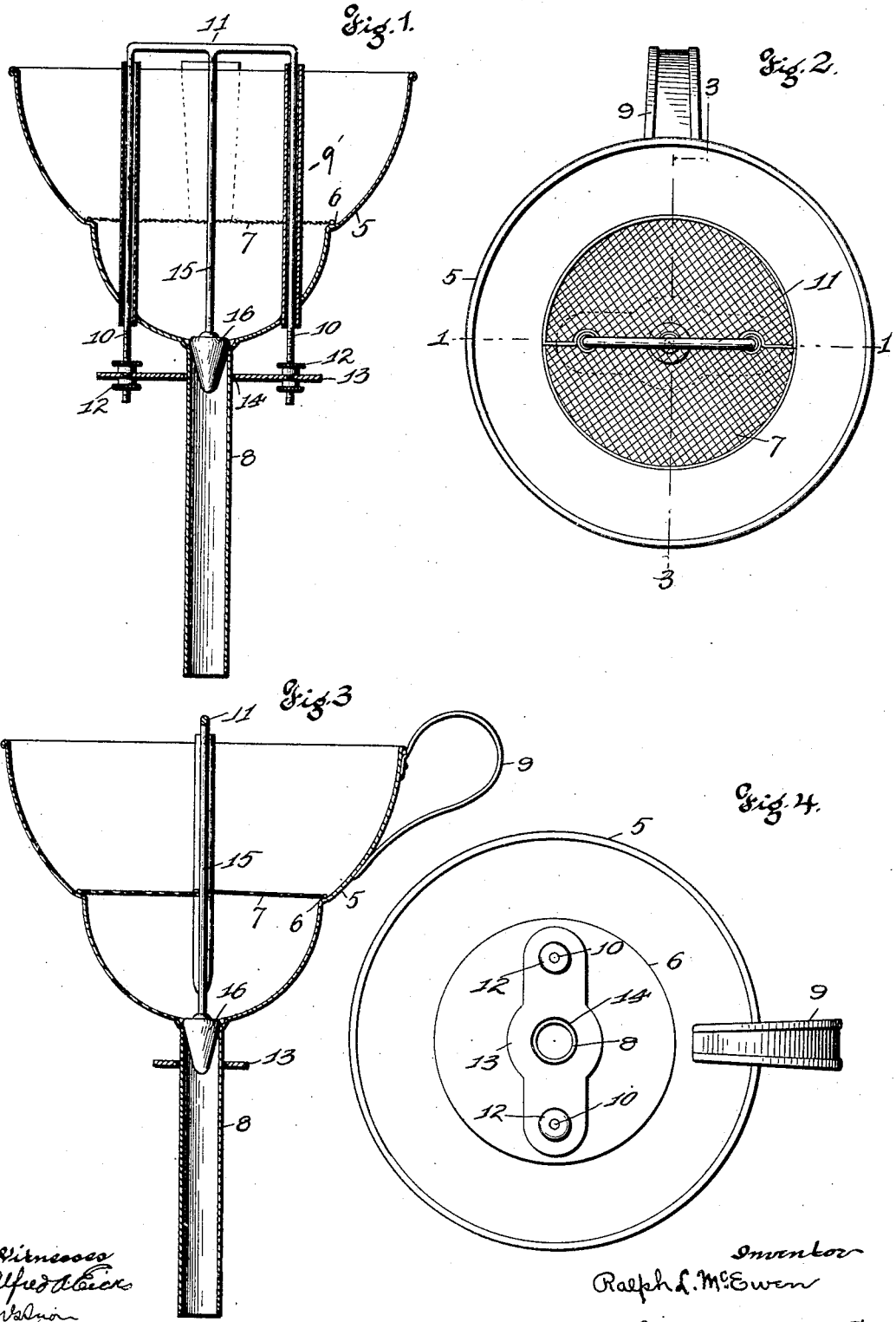

UNITED STATES PATENT OFFICE.

RALPH L. McEWEN, OF ST. LOUIS, MISSOURI.

AUTOMATIC FUNNEL.

SPECIFICATION forming part of Letters Patent No. 778,695, dated December 27, 1904.

Application filed August 28, 1903. Serial No. 171,111.

*To all whom it may concern:*

Be it known that I, RALPH L. McEWEN, a citizen of the United States, residing in St. Louis, Missouri, have invented certain new and useful Improvements in Automatic Funnels, of which the following is a specification containing a full, clear, and exact description, reference being had to the accompanying drawings, forming a part hereof.

My invention relates to improvements in automatic funnels; and it consists in the novel arrangement, construction, and combination of parts, as will be fully hereinafter described and claimed.

The object of this invention is to construct a funnel with a valve to be automatically opened when the funnel is placed in the neck of the bottle or jug.

A further object of my invention is that when the bottle or jug is completely filled it will prevent overflowing by the compression of air within the spout.

Figure 1 is a vertical sectional view of my improved funnel, taken on the line 1 1 of Fig. 2. Fig. 2 is a top plan view of the same. Fig. 3 is a vertical sectional view taken on the line 3 3 of Fig. 2. Fig. 4 is a bottom plan view.

In the construction of my improved funnel I provide a bowl 5, suitably bent to form a shoulder 6, upon which is placed and supported a strainer 7. To the bottom of the bowl 5 is securely mounted the spout 8 and to the upper side of said bowl is provided a handle 9. Rigidly mounted in the bowl 5 are vertically-projecting tubes 9', which project slightly above the upper portion of the bowl to prevent the flowing of the liquid into said tubes. Through the tubes 9' are passed the prongs 10 of the yoke 11, the said prongs being screw-threaded to receive the taps 12 for supporting and adjusting the operating-plate 13. The said plate 13 is provided with the opening 14 sufficiently large to freely move upon the spout 8. Secured to the center of the yoke is a downwardly-projecting rod 15, carrying the valve 16, which is so arranged to tightly close the mouth of the spout 8.

Especial attention is called to the fact that the operating mechanism is perfectly balanced and will not bind and stick; furthermore, that it is braced and protected so as not to be easily bent and rendered inoperative. To this end I employ two tubes 9' equal distances on each side of the spout 8. The two prongs 10 operate in said tubes, said prongs being rigidly secured together at their upper ends in constructing the yoke, and said prongs being rigidly secured together at their lower ends by being attached to the plate 13, and the valve 15 is hung at the center in line with the prong 10.

The strainer 7 is composed of two parts, one to slightly overlap the other to fit around the tubes 9' and the rod 15 and for the purpose of preventing foreign substances from passing into the receptacle to be filled.

The operation of my invention is as follows: The bowl of the funnel is filled with liquid and the spout 8 passed into the neck of the bottle or jug. The head of said bottle coming in contact with the bottom of the plate 13 will force it upwardly, opening the valve 16, allowing the liquid to flow within the bottle, and at the instant the bottle is sufficiently filled the flow of liquid will cease, which is caused by the proper adjustment of the plate 13. The moment the operator removes the funnel from the bottle the valve will automatically close by gravity, and the said funnel can be transferred from one bottle to the other without spilling any of the liquid contained therein. Should sediments lodge upon the strainer, the operator can at any time easily remove the strainers to clean them.

By means of the adjusting-screws 12 upon the prongs 10 of the yoke the plate 13 is adjusted thereon, which is for the purpose to regulate the movement of the valve 16 within the spout 8. This action is attained when the funnel is placed in position upon the receptacle to be filled with liquid, and when the receptacle is filled to the desired height the flow of liquid will cease. This operation is only attained by the proper and exact adjustment of the plate upon the prongs, which is held in its adjusted position by means of the screws previously described.

Having fully described my invention, what I claim is—

1. An automatic funnel comprising a bowl and spout formed integral with said bowl; vertical tubes extending upwardly in said bowl, said tubes being equal distance on each side of the center; a yoke having integral downwardly-projecting prongs, passing through and guided by the said tubes; a horizontal armed plate provided with a central opening passed loosely over the spout; said armed plate carried by the lower ends of the prongs; a plurality of nuts carried by the prongs and located one on each side of the armed plate for the purpose of adjusting said plate thereon; a valve-stem formed integral with and extending downwardly from the yoke; a valve carried by said valve-stem for automatically setting itself in the valve-seat when the funnel is removed from the receptacle, substantially as specified.

2. A funnel of the class described comprising a bowl; a shoulder 6 formed by the inward bend of the body; a strainer located within said bowl and supported upon said shoulder; vertical parallel tubes rigidly located within the bowl and passing a short distance downwardly through the bottom; a yoke comprising vertical parallel prongs 10 guided through said tubes; the valve-stem 15 formed integrally with the horizontal portion of the yoke; a valve carried by the lower end of said valve-stem and arranged to seat itself within the valve-seat; the tube 8 extending downwardly from the bottom of the bowl and formed integrally therewith; the horizontal armed plate arranged loosely around the spout and carried by the free ends of the prongs; a plurality of adjusting-nuts carried by the prongs and arranged on opposite sides of the armed plate for the purpose of adjusting the throw or operation of the valve for regulating the flow of liquid through the spout between the valve and valve-seat, substantially as specified.

In testimony whereof I have signed my name to this specification in presence of two subscribing witnesses.

RALPH L. McEWEN.

Witnesses:
M. G. IRION,
ALFRED A. EICKS.